United States Patent
Yoshida et al.

(10) Patent No.: US 7,553,570 B2
(45) Date of Patent: Jun. 30, 2009

(54) FUEL CELL

(75) Inventors: Kensuke Yoshida, Kawasaki (JP);
Hiroaki Yoshida, Kawasaki (JP);
Masami Tsutsumi, Kawasaki (JP);
Fumio Takei, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 677 days.

(21) Appl. No.: 11/022,884

(22) Filed: Dec. 28, 2004

(65) Prior Publication Data

US 2006/0035123 A1 Feb. 16, 2006

(30) Foreign Application Priority Data

Aug. 10, 2004 (JP) .............................. 2004-233726

(51) Int. Cl.
*H01M 8/04* (2006.01)
*H01M 8/06* (2006.01)
(52) U.S. Cl. ...................................................... 429/19
(58) Field of Classification Search ................... 429/19, 429/25, 26
See application file for complete search history.

(56) References Cited

U.S. PATENT DOCUMENTS

| 6,468,683 | B1 * | 10/2002 | Menzer et al. ................ 429/26 |
| 6,936,361 | B2 * | 8/2005 | Kelley et al. .................. 429/13 |
| 7,147,950 | B2 * | 12/2006 | Yonetsu et al. ................ 429/25 |
| 2003/0170508 | A1 * | 9/2003 | Beckmann et al. ............ 429/13 |
| 2004/0067394 | A1 * | 4/2004 | Sadamoto et al. ............. 429/12 |
| 2004/0209136 | A1 * | 10/2004 | Ren et al. ...................... 429/30 |

OTHER PUBLICATIONS

Patent Abstracts of Japan, Publication No. 2004142831, dated May 20, 2004.
Patent Abstracts of Japan, Publication No. 2000106201 A, dated Apr. 11, 2000.
Patent Abstracts of Japan and partial translation of Japanese Patent Application Laid-open No. 2004031026, dated Jan. 29, 2004.

* cited by examiner

*Primary Examiner*—Gregg Cantelmo
(74) *Attorney, Agent, or Firm*—Fujitsu Patent Center

(57) ABSTRACT

Back pressure is applied to a liquid fuel stored in a fuel storage unit by a pressure application unit, and a liquid fuel vaporization membrane that vaporizes the liquid fuel to thereby supply the vaporized fuel gas to an anode is formed by a nonporous membrane. Backed by this, the liquid fuel can be prevented from leaking out to the anode, so that the concentration of the liquid fuel can be increased to an optimum level.

13 Claims, 8 Drawing Sheets

FUEL CELL

CROSS-REFERENCE TO RELATED APPLICATIONS

This application is based upon and claims the benefit of priority from the prior Japanese Patent Application No. 2004-233726, filed on Aug. 10, 2004, the entire contents of which are incorporated herein by reference.

BACKGROUND OF THE INVENTION

1. Field of the Invention

The present invention relates to a fuel cell that vaporizes a liquid fuel stored in a fuel storage unit and uses the vaporized fuel gas to generate electric power.

2. Description of the Related Art

In recent years, together with the advance of portable type electronic equipment such as cellular phones, PDAs (Personal Digital Assistants), and notebook type personal computers, the batteries functioning as a driving power source and a memory retention power source are required to downsize, reduce weight, and increase capacity. For the current potable type electronic equipment, lithium ion batteries are used most commonly as the driving power source and so forth.

The lithium ion battery already exhibited a high driving voltage and a large capacity earlier when the battery was put into practice, and that, the performance of the battery has been improved to keep up with the advance of the portable electronic equipment. However, the lithium ion battery also has limitations in performance improvement, and is becoming impossible to satisfy requirements to serve as a driving power source or the like of the portable electronic equipment that will further improve to be highly functional from now on. On the back of this, developments were made for a new power generation device succeeding the lithium ion battery. As a result, a fuel cell promised to have a large capacity being several times of that of the lithium ion battery has finally been proposed.

Generally, the fuel cell is configured to include an anode (negative) and a cathode (positive) containing a catalyst, and a power generation unit composed of an electrolyte provided between the electrodes to allow certain traveling of ions. In the fuel cell, when a fuel and hydrogen are supplied to negative electrode and an air and oxygen are supplied to the positive electrode, an electrochemical reaction occurs at both the electrodes backed by the operation of the catalyst contained in the electrodes, so that direct current based on electron current can be brought out by the fuel as a supply source. In the fuel cell that generates power by such a mechanism, continuous power generation is possible for longer hours by replenishing the negative electrode with the fuel and the positive electrode with the oxygen, so that the fuel cell can be used in the same manner as a secondary battery and is expected applications to a power source for portable electronic equipment and the like.

The fuel cell is classified into a phosphoric-acid type, a proton exchange membrane type, a molten carbonate type, a solid oxide type, and so forth, in view of the type of its electrolyte. As a power source for the electronic equipment and the like, the fuel cell is required to be operative at a low temperature around a room temperature, downsized to compact, vibration tolerance, manufactured in large volume, and so on, so that the proton exchange type of fuel cell is considered to be appropriate.

In the proton exchange membrane fuel cell, as a fuel supply method, there are known methods of storing hydrogen gas to supply the hydrogen gas directly to the anode, storing organic fuel to supply hydrogen gas generated by reforming the organic fuel, storing a liquid fuel capable of supplying hydrogen to supply the liquid fuel directly to the anode, and so forth. Of these, the methods of supplying hydrogen directly and by reforming have difficulties such as in handling the hydrogen, in complicated configuration of equipment due to the reformation of fuel, and in indispensability of a device needing electric power, so that they are inappropriate as a small power source used in the portable electronic equipment. Accordingly, with a view to configure a small power source, the fuel cell adopting the method of supplying a liquid fuel, especially, a methanol solution to the anode, namely a direct methanol fuel cell system (DMFC) is gathering attentions.

Presently, many DMFCs have been developed. These DMFCs can be classified based on the fuel supply method to the power generation unit and the state of the fuel.

Firstly, based on the fuel supply system, the DMFCs can be classified into a system of compulsorily circulating the fuel by an auxiliary machine such as a pump, namely a so-called "active method", and of supplying the fuel by natural diffusion such as of gravity and capillarity, namely a so-called "passive method".

The DMFC of "active method" has a capability of mechanically controlling the concentration of the supplying liquid fuel, as a prime feature, in which water generated by a reaction when generating power is collected and then circulated. Therefore, problems of DMFC, a transmission of methanol to the electrolyte in the power generation unit, and accompanying performance degradation at the cathode, namely a crossover of methanol, can be prevented, and further, a methanol of higher concentration can be supplied.

Meanwhile, however, the DMFC of a "active method" has problems such as an increase in size due to its complicated mechanism, a need for electric power to operate, and so forth, being unsuitable to form the small power source for portable electronic equipment and the like. On the other hand, the DMFC of a "passive method" has a problem that the aforementioned crossover is difficult to be prevented therein even though it is easily downsized on the back of its simple mechanism.

Still further, in view of the state of fuel supplied to the power generation unit of the DMFC, the DMFCs can be classified into a "liquid supply system", in which the liquid fuel is directly supplied to the power generation unit, and a "gas supply system", in which the liquid fuel is vaporized and the fuel gas is supplied to the power generation unit.

In the DMFC of "liquid supply system", it is possible to supply the liquid fuel to the power generation unit by a variety of techniques such as gravity, capillarity, natural diffusion, and so on, since the fuel is liquid. On top of that, the DMFC of "active method" can also transport the liquid fuel easily by pump or the like. However, for preventing the aforementioned crossover, the DMFCs are required to suppress the concentration of methanol in the liquid fuel to lower, approximately to 5% to 10%.

Meanwhile, in the DMFC of "gas supply system", the concentration of the liquid fuel can be increased to higher since the fuel supplied to the power generation unit is a gas having smaller volume density than that of the liquid fuel, causing no concern about the crossover described above. In the case of the DMFC of "gas supply system", when it is of "active method", the mechanism is caused to be complicated, however, when it is of "passive method", with its simple mechanism supported by a natural vaporization technique, the DFMC can supply a fuel gas of even high concentration directly to the power generation unit. As a DMFC of "gas supply system" as well as "passive method", there is one disclosed in Japanese Patent No. 3413111 (Patent Document 1), as an example.

SUMMARY OF THE INVENTION

It is an object of the present invention to provide, for a fuel cell that performs power generation using a fuel gas being a vaporized liquid fuel, the fuel cell capable of performing the power generation using the fuel gas of an optimum concentration by increasing the concentration to thereby realize an improvement in power generation efficiency.

A fuel cell according to the present invention includes a power generation unit configured to have a positive electrode that reduces oxygen as an active material, a negative electrode that oxidizes a gaseous fuel, and an electrolyte layer provided between the positive electrode and the negative electrode; a fuel storage unit storing a liquid fuel; a pressure application unit applying pressure to the liquid fuel stored in the fuel storage unit; and a liquid fuel vaporization unit of a nonporous type vaporizing the liquid fuel pressed by the pressure application unit to supply the vaporized fuel to the negative electrode as the gaseous fuel.

The fuel cell according to another aspect of the present invention includes a power generation unit configured to have a positive electrode that reduces oxygen as an active material, a negative electrode that oxidizes a gaseous fuel, and an electrolyte layer provided between the positive electrode and the negative electrode; a gaseous fuel oxidization unit generating a reactive gas by oxidizing parts of the gaseous fuel supplied to the negative electrode and transmitting the reactive gas and remaining parts of the gaseous fuel therethrough, in which the reactive gas is one that is caused to chemically react with the gaseous fuel at the negative electrode.

DETAILED DESCRIPTION OF THE PREFERRED EMBODIMENTS

Basic Gist of the Present Invention

Figure 1:
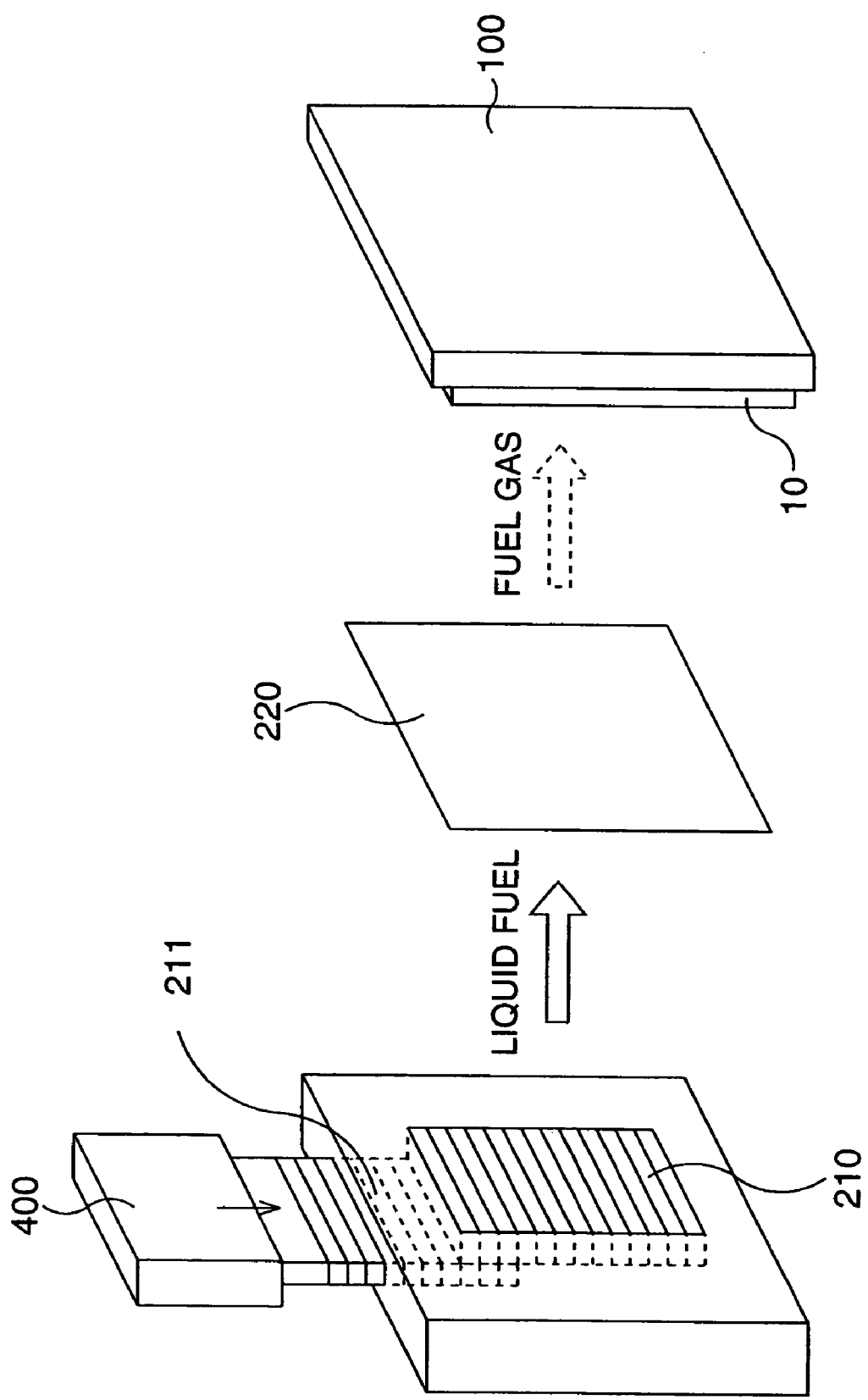
FIG. 1 is a schematic diagram of a fuel cell for illustrating a basic gist of the present invention.

In the conventional DMFC of "gas supply system" and "passive method", as described in Patent Document 1, the liquid fuel is vaporized in a vaporization membrane making use of capillarity, and the vaporized fuel gas is supplied to the power generation unit. Therefore, the speed of fuel supply to the power generation unit is extremely low as compared to that of "liquid supply system", above all, when the electrode of the power generation unit is increased in area, it is difficult to supply the fuel to allover the electrode. As a measure against the problem, a technique is conceivable in which back pressure is applied to the liquid fuel such as by a cartridge or the like as described in Japanese Patent Application Laid-Open No. 2004-142831 (Patent Document 2), and thereby the speed of fuel supply to the power generation unit is improved.

However, in the technique performing fuel supply using the vaporization membrane making use of capillarity, the balance of surface tension of the vaporization membrane is disrupted by the back pressure, and the liquid fuel leaks out to directly be supplied to the power generation unit without being vaporized in the vaporization membrane, so that the aforementioned crossover is caused to thereby degrade the power generation performance. Hence, when performing power generation by applying the back pressure to the liquid fuel, for the purpose of preventing the previously described crossover, there has been no way but to perform power generation with the liquid fuel of a concentration lower than the optimum concentration. Consequently, this causes to lower the power generation efficiency.

In an effort to bring a solution to a problem that, in a conventional fuel cell of gas supply system as well as passive method, for the purpose of avoiding a crossover, which is caused because a liquid fuel is supplied directly to a power generation unit without being vaporized, a power generation is forced to be conducted with a liquid fuel of low concentration to consequently suppress power generating efficiency, the present inventors have conceived a basic gist of the present invention, as will be described hereinbelow.

Firstly, the present inventors have decided to review materials of a vaporization membrane vaporizing a liquid fuel into a fuel gas.

The present inventors then pay attention to a fact that the vaporization membrane taking advantage of capillarity and used in conventional fuel cells is porous in its quality of material and has many pores inside, causing the liquid fuel to transmit through the vaporization membrane to leak out depending on the pressure in a fuel storage unit. The present inventors have devised to adopt a nonporous membrane having no pore inside and being a close membrane. More specifically, the nonporous membrane is a dense membrane to the extent of vaporizing a liquid fuel by dissolving the liquid fuel into inside itself and transmitting the vaporized fuel gas therethrough. As a nonporous membrane of such, for example, one made of a perfluoro sulfonic acid based resin, a perfluoro sulfonic acid based resin containing a carboxyl group, silicone and/or polyimide, as a main material, is applicable.

FIG. 1 is a schematic diagram of a fuel cell for illustrating the basic gist of the present invention.

As shown in FIG. 1, the fuel cell includes a fuel storage unit 210 storing a liquid fuel on the side of an anode (negative electrode) 10 provided in a power generation unit 100, in which back pressure is applied to the liquid fuel in the fuel storage unit 210 via a fuel supply port 211 by a pressure application unit 400. Then, between the fuel storage unit 210 and the anode 10, there is provided a nonporous liquid fuel vaporization membrane 220 that vaporizes the liquid fuel supplied from the fuel storage unit 210 and then supplies the vaporized liquid gas to the anode 10.

Generally, the transmission mechanism of a porous membrane is considered attributable to surface diffusion (capillarity) or the like to inside walls of the pores, while the transmission mechanism of a nonporous membrane is considered attributable to dissolution and diffusion into the nonporous membrane. In other words, the conventionally used porous membrane blocks transmission of the liquid fuel but allows transmission of the fuel gas by taking advantage of the differences between surface tensions or the like of the inside walls of the pores to the liquid fuel and the fuel gas. As a result, when a vaporization membrane adopting the porous membrane is applied back pressure stronger than the surface tension of the liquid fuel, the vaporization membrane ends up to leak the liquid fuel outside.

On the other hand, since the nonporous membrane of the present invention has no pore inside itself, the nonporous membrane dissolves and diffuses the liquid fuel thereinto to vaporize, and transmits the vaporized fuel gas therethrough, without leaking the liquid fuel even if outside pressure is applied to the fuel storage unit. Therefore, with the use of the nonporous vaporization membrane to vaporize the liquid gas, decline in power generation efficiency caused by the liquid fuel reaching the power generation unit 100 can be prevented. Accordingly, a power generation using a liquid fuel of an optimum concentration can be realized by increasing the concentration to higher as a substitute for the conventional power generation using the liquid fuel of low concentration.

Also, the present inventors review the concentration of the liquid fuel when continuing to generate electric power.

As a liquid fuel, for example, when a methanol solution being a mixed solution of water and methanol is in use, a reaction occurs at the anode 10 in the case where water to methanol is 1:1 (=methanol 64 wt %) in terms of mole ratio. When the methanol solution is vaporized naturally, the methanol solution comes to be a mixed gas in which methanol has a larger composition ratio than that of water as a fuel gas due to the difference in atmospheric saturation vapor pressures between water and methanol, so that methanol is vaporized prior to water even in the case of the liquid fuel. Accordingly, as the power generation is continued, the concentration of the liquid fuel in the fuel storage unit 210 lowers, requiring replenishment or replacement of the liquid fuel at certain timings.

Therefore, in an effort to realize a power generation with more concentrated liquid fuel to thereby keep power generation efficiency as well as improve maintainability of the liquid fuel in the fuel storage unit 210 such as replenishment, replacement, or the like, the present inventors have devised a fuel cell as will be described hereinbelow.

Figure 2:
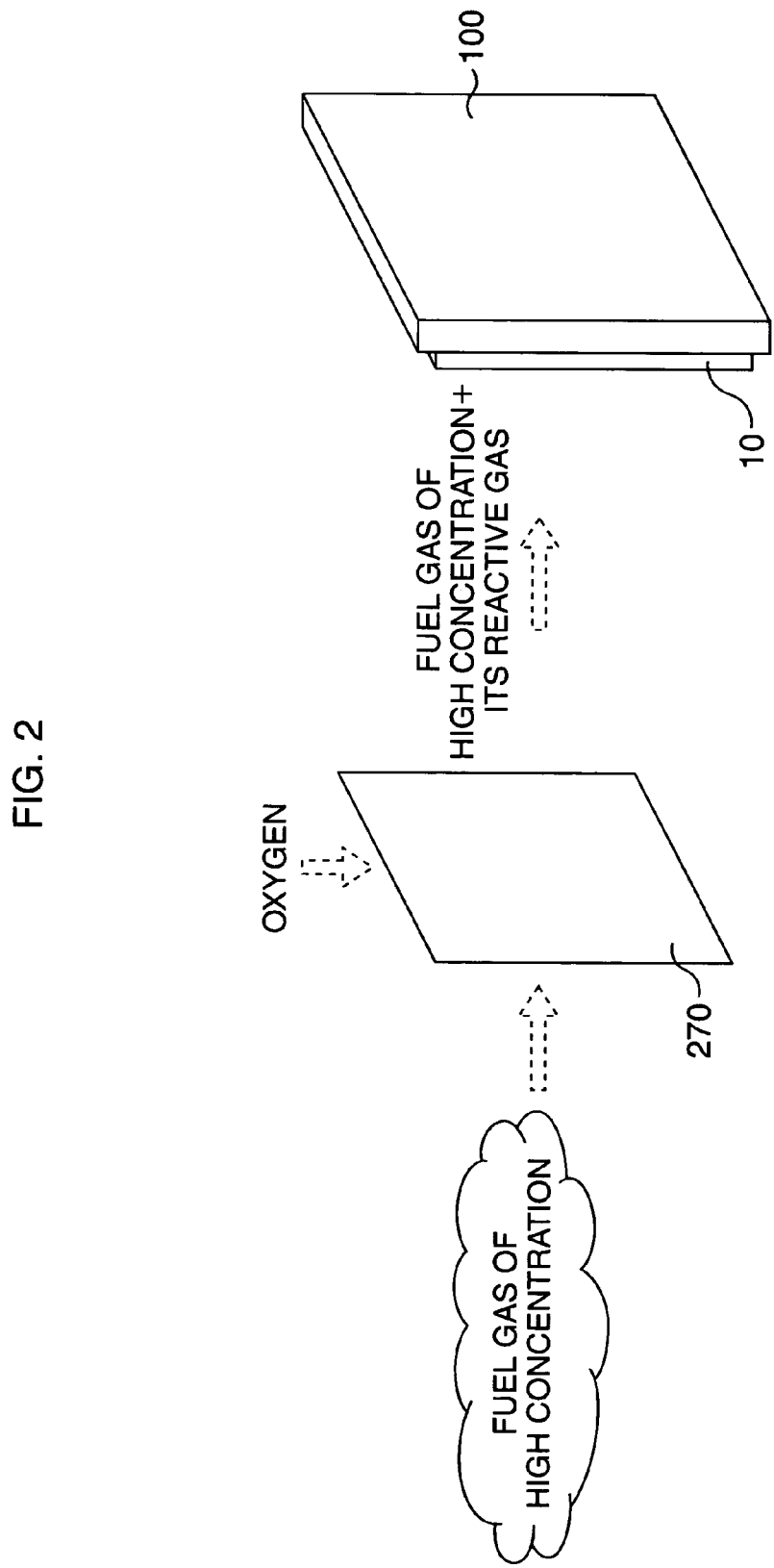
FIG. 2 is a schematic diagram of the fuel cell for illustrating the basic gist of the present invention.

FIG. 2 is a schematic diagram of the fuel cell for illustrating the basic gist of the present invention.

As shown in FIG. 2, this fuel cell includes a fuel gas oxidization layer 270 oxidizing parts of a highly concentrated fuel gas (e.g. concentration ratio of 99.9%). For instance, when a gas in which methanol has a higher composition ratio to water (hereinafter referred to as a "high methanol compounded gas") is in use, parts of the high methanol compounded gas is oxidized using oxygen introduced from outside in the fuel gas oxidization layer 270, and water vapor generated by the oxidization as well as the rest of the high methanol compounded gas are supplied to the anode 10 of the power generation unit 100. Specifically, in the fuel gas oxidization layer 270, the supplied fuel gas are partially oxidized to generate a reactive gas that reacts at the anode 10 with the fuel gas transmitted through the fuel gas oxidization layer 270.

As a fuel gas oxidization layer 270, for example, a precious metal catalyst for example of platinum (Pt), palladium (Pd), ruthenium (Ru), rhodium (Rh), or so force, or otherwise a catalyst made of an alloy of the precious metals may be employed. When such a catalyst is employed, the chemical reaction that occurs in the fuel gas oxidization layer 270 is considered as shown in Formula 1 below.

$$CH_3OH+(3/2)O_2 \rightarrow CO_2+2H_2O \quad \text{(Formula 1)}$$

Here, carbon dioxide generated by the oxidization reaction in the fuel gas oxidization layer 270 is released in the air by passing through the same path as of the oxygen supplied to the fuel gas oxidization layer 270.

Further, the chemical reaction that occurs at the anode 10 is considered as shown in Formula 2 below.

$$CH_3OH+H_2O \rightarrow CO_2+6H^++6e^- \quad \text{(Formula 2)}$$

The present inventors have realized high concentration of the supplied fuel gas ($CH_3OH$ in Formula 1) by using parts of the supplied fuel gas to generate a reactive gas ($H_2O$ in Formula 2) that reacts with the fuel gas at the anode 10. Therefore, for example, the power generation using the fuel gas of a concentration of approximately 100% is also possible, and as a result, the concentration of the liquid fuel in the fuel storage unit 210 can be increased. Above all, when methanol of a concentration of 100% is employed, there is no fluctuation in the fuel concentration accompanied by fuel consumption, requiring no liquid fuel replacement, so that maintainability can be improved.

Embodiments of the Present Invention

Subsequently, embodiments reflecting the basic gist of the present invention will be described with reference to the drawings.

First Embodiment

Figure 3:
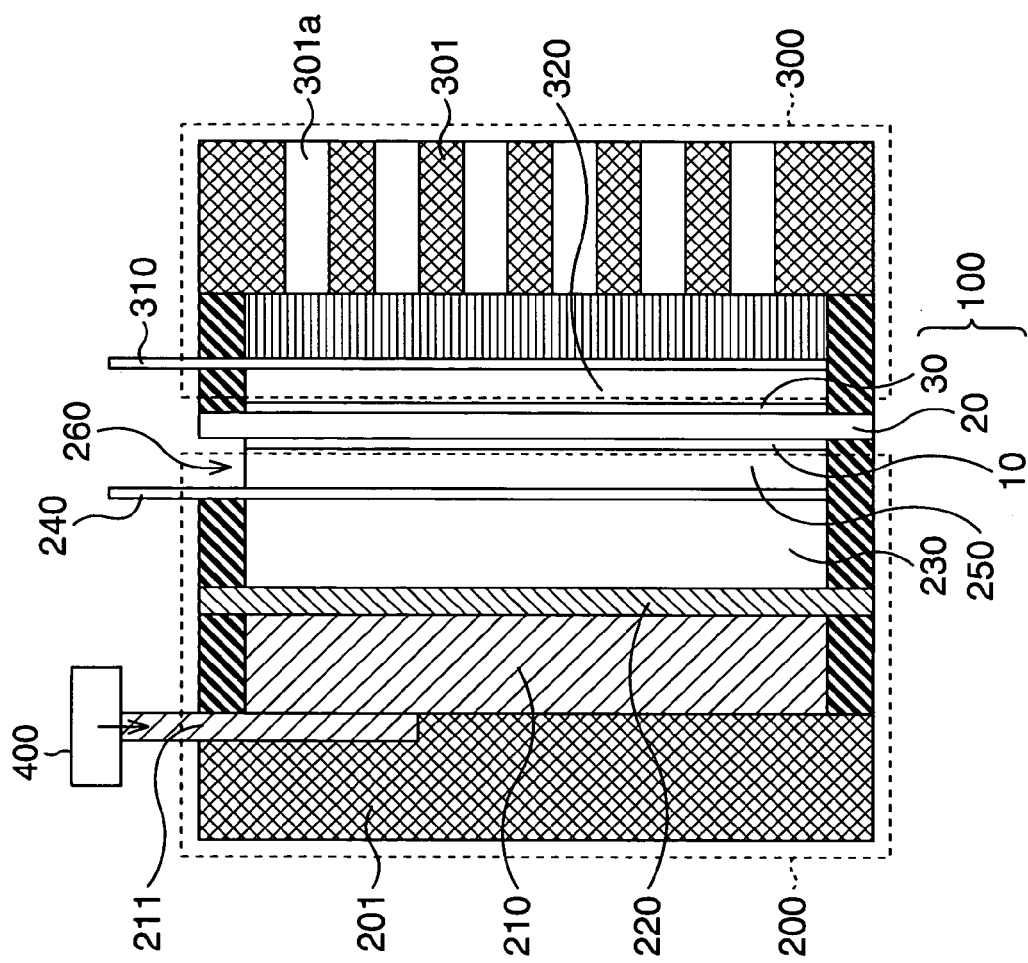
FIG. 3 is a schematic sectional view of a fuel cell according to a first embodiment of the present invention.

FIG. 3 is a schematic sectional view of a fuel cell according to a first embodiment of the present invention.

The fuel cell includes a power generation unit 100 generating power, a fuel supply mechanism 200 provided on the side of an anode 10 of the power generation unit 100, an air supply mechanism 300 provide on the side of a cathode 30 of the power generation unit 100, and a pressure application unit 400 applying pressure to a liquid fuel stored in a fuel storage unit 210 provided in the fuel supply mechanism 200. For the liquid fuel in the present embodiment, a methanol solution being a mixed solution of water and methanol may be used, as an example.

The power generation unit 100 is configured to include the anode 10 oxidizing a gaseous fuel to generate electrons and protons, the cathode 30 generating water from ions generated by reducing oxygen as an active material and the electrons and protons generated at the anode 10, a solid electrolyte layer 20 provided between the anode 10 and the cathode 30 and transmitting the protons generated at the anode 10 to the cathode 30.

The fuel supply mechanism 200 is composed of an anode side casing 201, the fuel storage unit 210 storing the liquid fuel supplied from a fuel supply port 211, and a nonporous, and is configured to include a liquid fuel vaporization membrane 220 vaporizing the liquid fuel into a gaseous fuel, an anode gas diffusion layer 230 diffusing the gaseous fuel vaporized in the liquid fuel vaporization membrane 220, an anode current collector 240 for introducing the gaseous fuel into the anode 10, and an anode gas diffusion layer 250 for diffusing the gaseous fuel from the anode current collector 240 and supplying the diffused gaseous fuel to the anode 10.

Further, above the anode gas diffusion layer 250, there is provided a gas derivation and introduction unit 260 introducing a gas into the anode 10 and driving the generated gas (carbon dioxide) generated at the anode 10. It should be noted that the liquid fuel stored in the fuel storage unit 210 is applied pressure by nitrogen ($N_2$) gas or the like supplied from the pressure application unit 400.

The air supply mechanism 300 is configured to include a cathode side casing 301, a cathode current collector 310 for introducing oxygen supplied from an oxygen supply port 301a of the cathode side casing 301 into a cathode 30, a cathode gas diffusion layer 320 for diffusing the oxygen from the cathode current collector 310 and supplying the diffused oxygen to the cathode 30.

Figure 4:
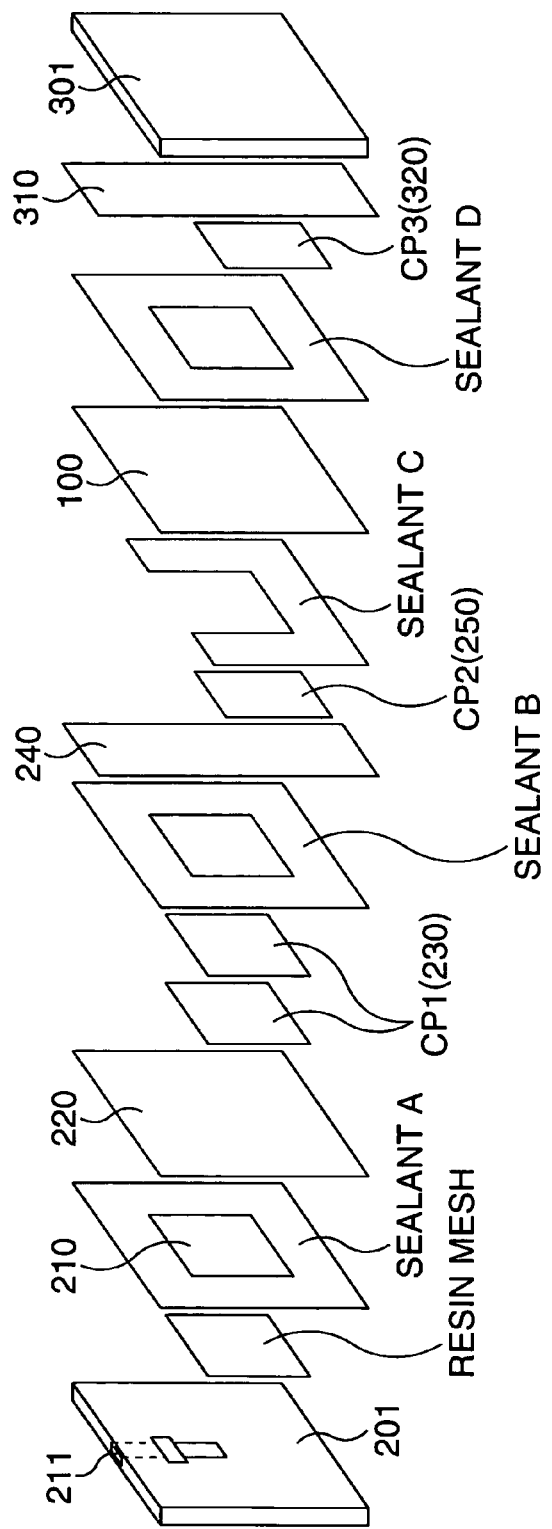
FIG. 4 is an exploded perspective view of the fuel cell according to the first embodiment of the present invention.

FIG. 4 is an exploded perspective view of the fuel cell according to the first embodiment of the present invention. The drawing is the exploded perspective view of the power generation unit 100, the fuel supply mechanism 200, and the air supply mechanism 300 in FIG. 3.

The liquid fuel supplied from the fuel supply port 211 is stored in a hollow portion of a sealant A via a resin of mesh texture (resin mesh). The hollow portion corresponds to the fuel storage unit 210 in FIG. 3. The liquid fuel stored in the fuel storage unit 210 is vaporized in the liquid fuel vaporization membrane 220. Here, the liquid fuel vaporization membrane 220 is formed by a nonporous membrane easy to osmose and transmit the liquid fuel, and is easily releasable a gaseous fuel from the surface thereof. As a nonporous membrane here, a perfluoro sulfonic acid based resin membrane (for example, one supplied by DuPont under the product name Nafion, one supplied by Asahi Kasei Corporation under the product name Aciplex, and so forth), a perfluoro carbon based resin membrane containing a carboxyl group (for example, one supplied by Asahi Glass Co., Ltd. under the product name Flemion and so forth), a silicone membrane, a polyimide membrane, or the like may be used.

On the power generation unit 100 side of the liquid fuel vaporization membrane 220, carbon papers 1 (hereinafter referred to as "CP(s)") formed by a porous body are disposed. The CPs 1 correspond to the anode gas diffusion layer 230 in FIG. 3. There are provided two sheets of CPs in FIG. 4, whereas it may be composed of one sheet of CP. Further, a sealant B seals the CPs 1.

The liquid fuel transmitted through the CPs 1 is sent to the anode current collector 240. The anode current collector 240 is made of a metal having conductivity and high corrosion resistance such as nickel, SUS304, SUS316, or the like. Further, it is formed of a mesh, an expanded metal, a foam metal, or so forth, so that the gaseous fuel can be introduced into the anode of the power generation unit 100. Subsequently, the gaseous fuel from the anode current collector 240 is sent to a CP 2. The CP 2 corresponds to the anode gas diffusion layer 250 in FIG. 3. Since the CP 2 is formed by a porous body and disposed between the anode of the power generation unit 100 and the anode current collector 240, the CP 2 has conductivity. A sealant C releases the upper portion of the CP 2 only in the air and seals the remaining portion. Then, the gaseous fuel from the CP 2 is sent to the anode of the power generation unit 100.

Meanwhile, the oxygen supplied from a cathode side casing 301 is introduced into the cathode current collector 310. As in the case of the anode current collector 240, the cathode current collector 310 is made of a metal having conductivity and high corrosion resistance such as nickel, SUS304, SUS316, or the like. Further, it is formed of a mesh, an expanded metal, a foam metal, or so forth, so that oxygen can be introduced into the cathode of the power generation unit 100. Subsequently, the oxygen from the cathode current collector 310 is sent to a CP 3. The CP 3 corresponds to the cathode gas diffusion layer 320 in FIG. 3. Since the CP 3 is formed by a porous body and disposed between the cathode of the power generation unit 100 and the cathode current collector 310, the CP 3 has conductivity. A sealant D seals the CP 3. Then, the oxygen from the CP 3 is sent to the cathode of the power generation unit 100.

Figure 5:
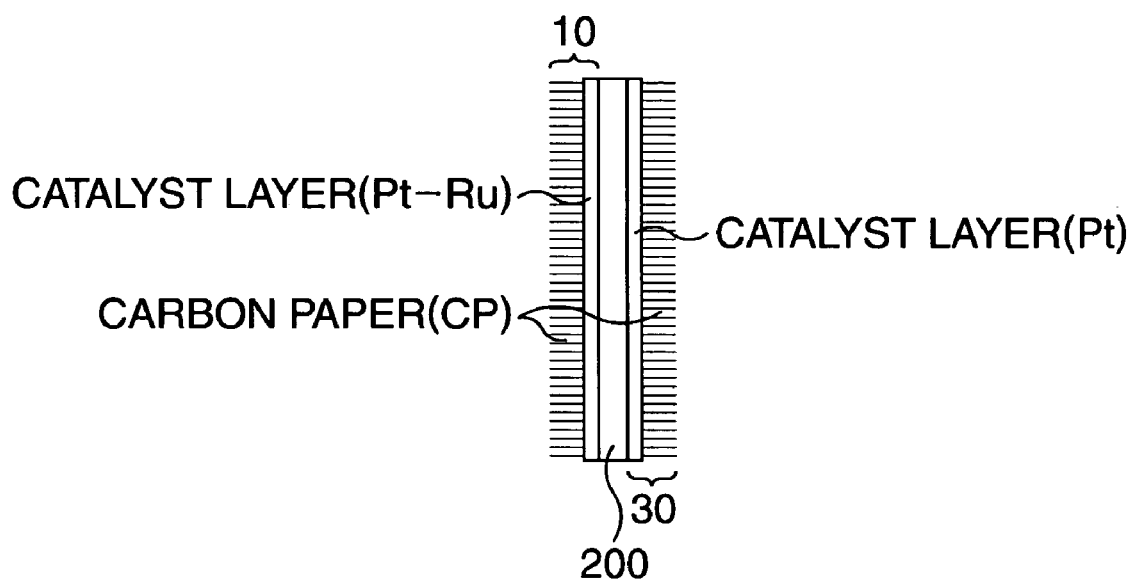
FIG. 5 is a sectional view showing a schematic configuration of a power generation unit.

FIG. 5 is a sectional view showing a schematic configuration of the power generation unit 100.

As previously described, the power generation unit 100 is composed of the anode 10, the cathode 30, and the solid electrolyte layer 20 provided therebetween. The anode 10 is configured to include the CP formed by a porous body and a catalyst layer made of an alloy of platinum (Pt) and ruthenium (Ru) on the CP, and the catalyst layer is disposed so as to contact the solid electrolyte layer 20. The cathode 30 is configured to include the CP formed by a porous body and a catalyst layer made of platinum (Pt) on the CP, and the catalyst layer is disposed so as to contact the solid electrolyte layer 20. Further, the solid electrolyte layer 20 is made of a material having proton conductivity, namely the material having a polar group such as a strong acid group including a sulfon group, a phosphate group, or the like, and a weal acid group such as a carboxyl group, or the like; and the perfluoro sulfonic acid based resin (for example, one supplied by DuPont under the product name Nafion, one supplied by Asahi Kasei Corporation under the product name Aciplex, and so forth) and the perfluoro carbon based resin membrane containing a carboxyl group (for example, one supplied by Asahi Glass Co., Ltd. under the product name Flemion and so forth) may be used therefor.

According to the first embodiment of the present invention, the nonporous liquid fuel vaporization membrane 220 that vaporizes the liquid fuel supplied from the fuel storage unit 210 and supplies the vaporized liquid gas to the anode 10 is provided between the fuel storage unit 210 and the anode 10, so that the liquid fuel in the fuel storage unit 210 can be prevented from leaking out to the anode 10. Backed by this, it is possible to conduct the power generation using the liquid fuel of an optimum concentration by increasing the concentration instead of the conventional power generation using the liquid fuel of low concentration to prevent the aforementioned crossover, so that the power generation efficiency can be improved.

Second Embodiment

Figure 6:
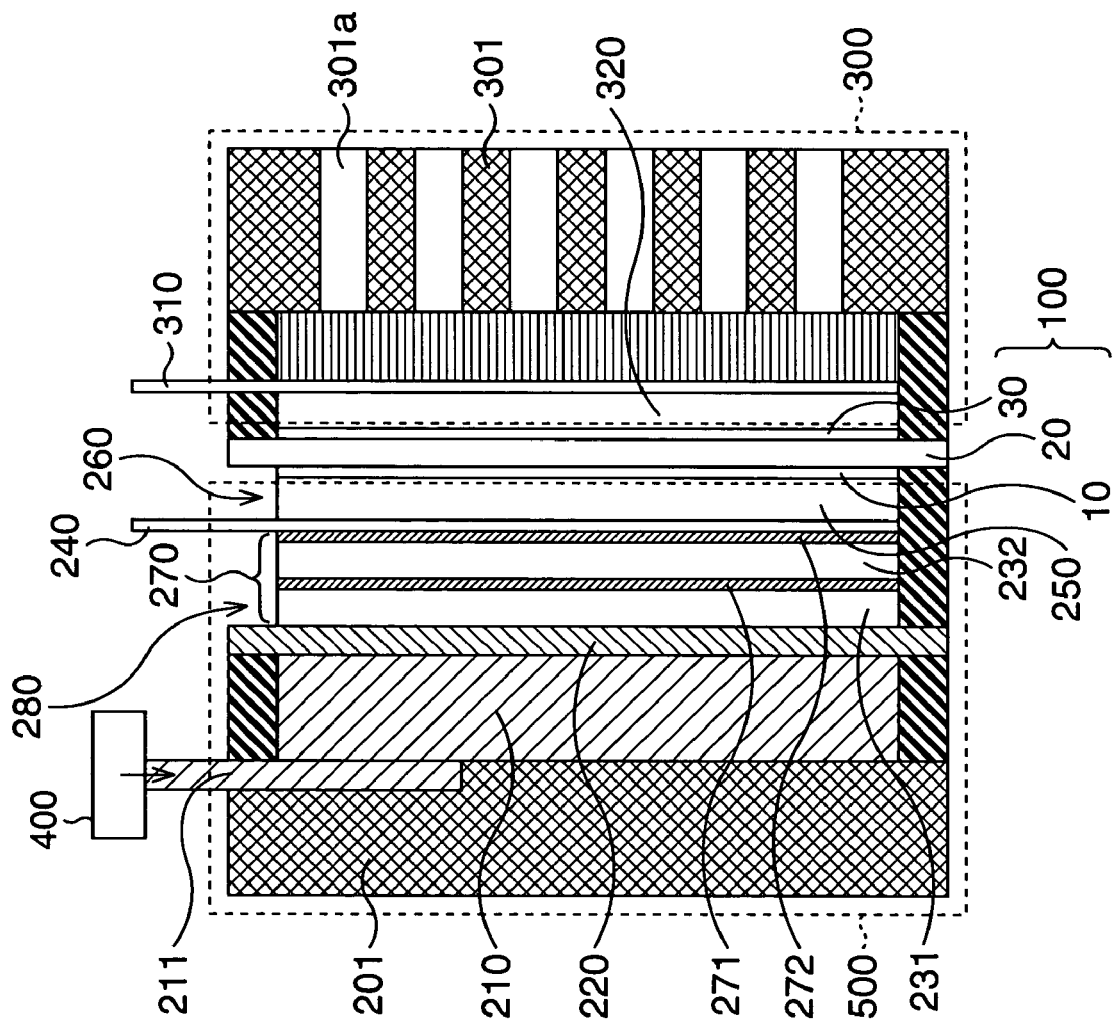
FIG. 6 is a schematic sectional view of a fuel cell according to a second embodiment of the present invention.

FIG. 6 is a schematic sectional view of a fuel cell according to a second embodiment of the present invention.

The fuel cell includes a power generation unit 100 generating power, a fuel supply mechanism 500 provided on the side of an anode 10 of the power generation unit 100, an air supply mechanism 300 provided on the side of a cathode 30 of the power generation unit 100, and a pressure application unit 400 applying pressure to a liquid fuel stored in a fuel storage unit 210 provided in the fuel supply mechanism 500. Further, as a liquid fuel in the present embodiment, for example, among mixed solutions of water and methanol, the one in which the methanol has an extremely larger composition ratio than that of water, or 100% methanol may be used. Hereinafter, this mixed solution is referred to as a "high methanol compounded solution", and in the below, the description will be given for an example using this high methanol compounded solution.

The power generation unit 100 is configured to include the anode 10 oxidizing a gaseous fuel to generate electrons and protons, a cathode 30 generating water from ions generated by reducing oxygen as an active material and electrons and protons generated at the anode 10, a solid electrolyte layer 20 provided between the anode 10 and the cathode 30 and transmitting the protons generated at the anode 10 to the cathode 30.

The fuel supply mechanism 500 is configured to include an anode side casing 201, the fuel storage unit 210 storing the liquid fuel (a high methanol compounded solution in the present embodiment) supplied from a fuel supply port 211, a liquid fuel vaporization membrane 220 formed by nonporous and vaporizing the high methanol compounded solution into a gaseous fuel (high methanol compounded gas), an anode gas diffusion layer 231 diffusing the high methanol compounded gas vaporized in the liquid fuel vaporization membrane 220, a catalyst layer 271 oxidizing parts of the high methanol compounded gas from the anode gas diffusion layer 231 to generate water vapor, an anode gas diffusion layer 232 diffusing the water vapor generated in the catalyst layer 271 and the rest of the high methanol compounded gas transmitted through the catalyst layer 271, a catalyst layer 272 oxidizing parts of the high methanol compounded gas from the anode gas diffusion layer 232 to generate water vapor, an anode current collector 240 for introducing the water vapor generated in the catalyst layer 272 and the rest of the high methanol compounded gas transmitted through the catalyst layer 272 into the anode 10, an anode gas diffusion layer 250 for diffusing the high methanol compounded gas and water vapor from the anode current collector 240 to supply them to the anode 10.

Since the anode gas diffusion layer 231 and the catalyst layer 271, and the anode gas diffusion layer 232 and the catalyst layer 272 carry out a function of reforming the parts of the high methanol compounded gas into water vapor, they compose a fuel gas oxidization layer 270 here. Above the fuel gas oxidization layer 270, there is provided a gas derivation and introduction unit 280 for supplying oxygen to react with the high methanol compounded gas. Also, a gas generated by the oxidization reaction is discharged via the gas derivation and introduction unit 280.

Further, above the anode gas diffusion layer 250, there is provided a gas derivation and introduction unit 260 introducing a gas into the anode 10 and deriving a generated gas (carbon dioxide) generated at the anode 10. It should be noted that the liquid fuel stored in the fuel storage unit 210 is applied pressure by nitrogen ($N_2$) gas or the like supplied from the pressure application unit 400.

The air supply mechanism 300 is configured to include a cathode side casing 301, a cathode current collector 310 for introducing oxygen supplied from an oxygen supply port 301a of the cathode side casing 301 into the cathode 30, a cathode gas diffusion layer 320 for diffusing the oxygen from the cathode current collector 310 and supplying the diffused oxygen to the cathode 30.

Figure 7:
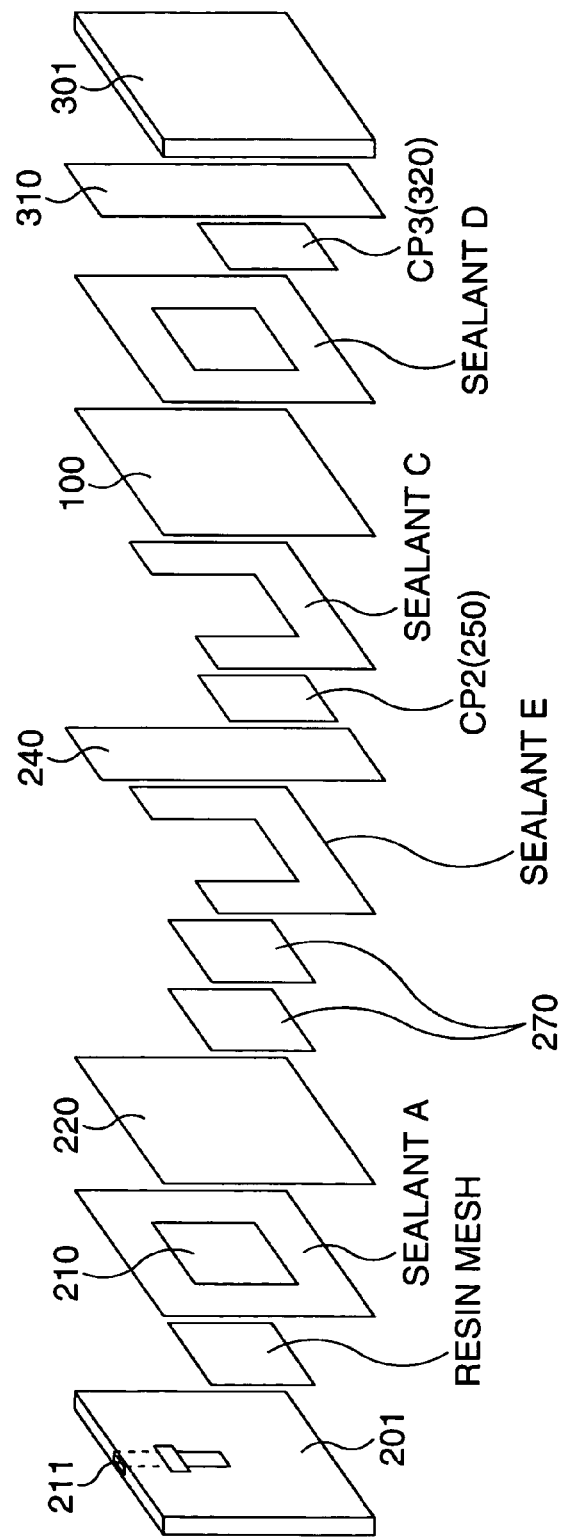
FIG. 7 is an exploded perspective view of the fuel cell according to the second embodiment of the present invention.

FIG. 7 is an exploded perspective view of the fuel cell according to the second embodiment of the present invention.

The high methanol compound solution supplied from the fuel supply port 211 is stored in a hollow portion of a sealant A via a resin of mesh texture (resin mesh). The hollow portion corresponds to the fuel storage unit 210 in FIG. 6. The high methanol compound solution stored in the fuel storage unit 210 is vaporized in the liquid fuel vaporization membrane 220. Here, the liquid fuel vaporization membrane 220 is formed by a nonporous membrane easy to osmose and transmit the high methanol compound solution, and is easily releasable the high methanol compounded gas from the surface thereof. As a nonporous membrane here, a perfluoro sulfonic acid based resin membrane (for example, one supplied by DuPont under the product name Nafion, one supplied by Asahi Kasei Corporation under the product name Aciplex, and so forth), a perfluoro carbon based resin membrane containing a carboxyl group (for example, one supplied by Asahi Glass Co., Ltd. under the product name Flemion and so forth), a silicone membrane, a polyimide membrane, or the like may be used.

Figure 8:
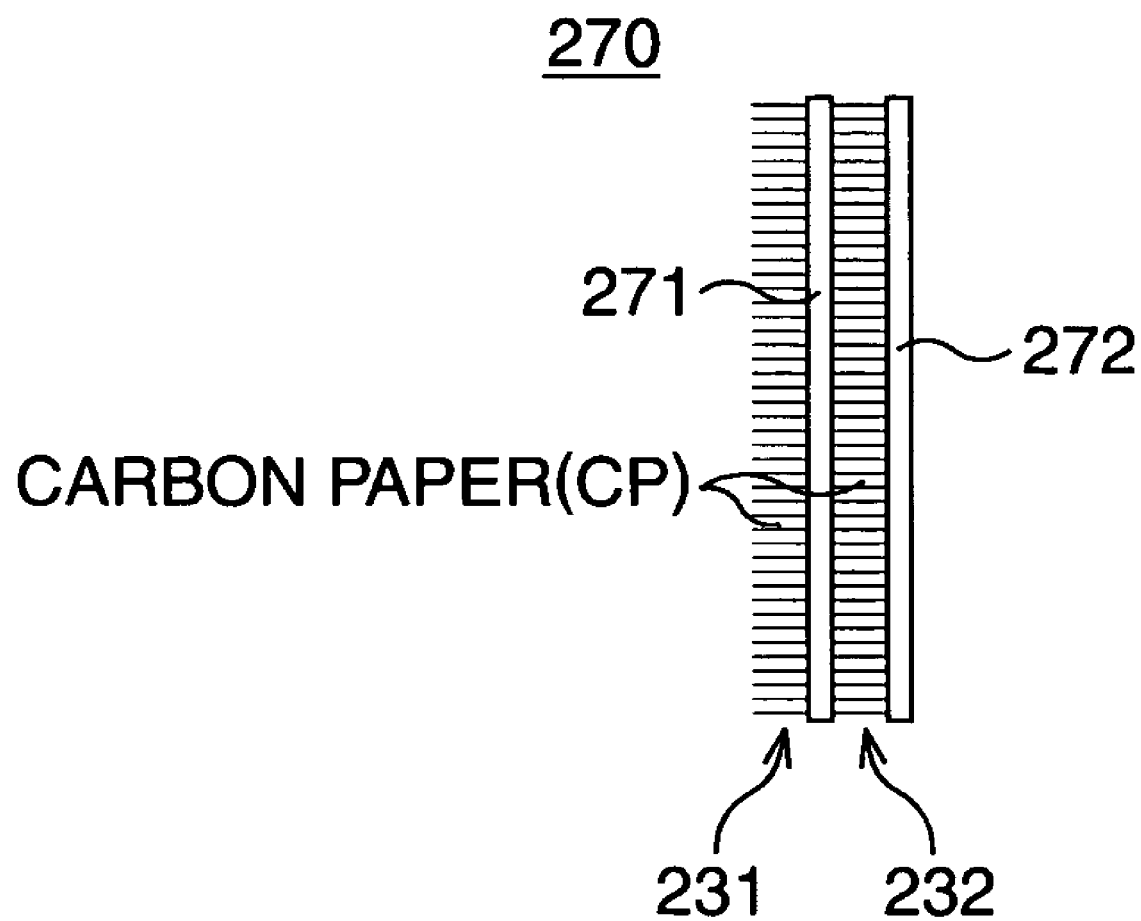
FIG. 8 is a sectional view showing a schematic configuration of a fuel gas oxidization layer.

On the power generation unit 100 side of the liquid fuel vaporization membrane 220, a fuel gas oxidization layer 270 is disposed. The fuel gas oxidization layer 270 is configured to include CPs formed by a porous body and catalyst layers 271, 272 made of platinum (Pt) on the CPs, as shown in FIG. 8. The respective CPs in FIG. 8 correspond to the anode gas diffusion layers 231, 232 in FIG. 6. Here, although the fuel gas oxidization layer 270 of the present embodiment is formed by having a two-layer structure, it may be formed by one layer or three or more layers. Further, the catalyst layers 271, 272 of the present embodiment are made of platinum (Pt), whereas the present invention is not limited thereto, and a precious metal such as palladium (Pd), ruthenium (Ru), rhodium (Rh), and the like, or an alloy of them may be used. Still further, the catalyst layers 271, 272 are made of fine particles of the aforementioned metals, the fine particles supported on carbon or the like, and so forth. Then, resins such as polytetrafluoroethylene (PTFE), polyvinylidene fluoride (PVDF), and solid polymer electrolyte are mixed and coated and so on to secure the catalyst layers 271, 272. A sealant E in FIG. 7 releases the upper portion of the fuel gas oxidization layer 270 only in the air and seals the remaining portion. Accordingly, the gas derivation and introduction unit 280 in FIG. 6 is configured.

The high methanol compounded gas and water vapor transmitted through the fuel gas oxidization layer 270 are sent to the anode current collector 240. The anode current collector 240 is made of a metal having conductivity and high corrosion resistance such as nickel, SUS304, SUS316, or the like. Further, it is formed of a mesh, an expanded metal, a foam metal, or so forth, so that the high methanol compounded gas and water vapor can be introduced into the anode of the power generation unit 100. Subsequently, the high methanol compounded gas and water vapor from the anode current collector 240 are sent to a CP 2. The CP 2 corresponds to the anode gas diffusion layer 250 in FIG. 6. Since the CP 2 is formed by a porous body and disposed between the anode of the power generation unit 100 and the anode current collector 240, the CP 2 has conductivity. A sealant C releases the upper portion of the CP 2 only in the air and seals the remaining portion. Then, the gaseous fuel from the CP 2 is sent to the anode of the power generation unit 100.

Meanwhile, the oxygen supplied from a cathode side casing 301 is introduced into the cathode current collector 310. As in the case of the anode current collector 240, the cathode current collector 310 is made of a metal having conductivity and high corrosion resistance such as nickel, SUS304, SUS316, or the like. Further, it is formed of a mesh, an expanded metal, a foam metal, or so forth, so that the oxygen can be introduced into the cathode of the power generation unit 100. Subsequently, the oxygen from the cathode current collector 310 is sent to a CP 3. The CP 3 corresponds to the cathode gas diffusion layer 320 in FIG. 6. Since the CP 3 is formed by a porous body and disposed between the cathode of the power generation unit 100 and the cathode current collector 310, the CP 3 has conductivity. A sealant D seals the CP 3. Then, the oxygen from the CP 3 is sent to the cathode of the power generation unit 100.

Subsequently, with regard to the fuel cell according to the second embodiment of the present invention, the result of an experiment actually conducted will be described hereinbelow.

First, as a fuel cell, one as described below was fabricated.

A platinum and ruthenium alloy supported catalyst is used for the anode 10, a platinum supported catalyst is used for the cathode 30, a perfluoro sulfonic acid polymer based resin, namely that supplied by DuPont under the product name Nafion 112 is used for the solid electrolyte layer 20 to thereby fabricate the power generation unit 100. Further, a platinum supported catalyst is used for the catalyst layers 271, 272.

Then, the experiment is conducted for continuous discharge characteristics.

Step S1: As a liquid fuel, 99.9% methanol is used, and 1 cc of the 99.9% methanol is supplied to the fuel storage unit 210 and the fuel level is confirmed.

Step S2: Nitrogen ($N_2$) gas is supplied from the pressure application unit 400 to apply back pressure at 0.1 MPa to the liquid fuel in the fuel storage unit 210.

Step S3: The fuel cell is supplied with constant current at 60 mA/$cm^2$ and then discharges.

Step S4: The discharge is ended after the voltage of the fuel cell is increased and then lowers to 0.1 V.

Step S5: The 99.9% methanol being the liquid fuel is replenished to the fuel level in Step S1.

Step S6: Step S2 through Step S5 are regarded as one cycle, and three cycles are repeatedly performed in total in this experiment for continuous discharge characteristics.

Hereinbelow, the result of the above-described continuous discharge characteristics experiment will be shown.

First Cycle: average discharge voltage: 0.20 V, discharge time: 70 minutes.

Second Cycle: average discharge voltage: 0.19 V, discharge time: 72 minutes.

Third Cycle: average discharge voltage: 0.19 V, discharge time: 70 minutes.

Based on the experimental result about continuous discharge characteristics in the above, it is found that, even though the back pressure is applied to the fuel, stable operation can be obtained, and that, even though the liquid fuel is replenished repeatedly, the discharge characteristics can be retained. Backed by this, the fuel cell according to the second embodiment is proved to have a capability of operating stably even when the high methanol compounded solution is used as a liquid fuel.

According to the second embodiment of the present invention, there is provided the fuel gas oxidization layer 270 that oxidizes parts of a high methanol compounded gas supplied and generates water vapor to react with the rest of the high methanol compounded gas at the anode 10, so that the power generation efficiency can be continuously kept, and the maintainability of the liquid fuel in the fuel storage unit 210 such as replenishment or replacement can be improved, in addition to the effect in the first embodiment.

According to the present invention, there is provided a liquid fuel vaporization unit of a nonporous type, so that the liquid fuel in a fuel storage unit can be prevented from leaking out to an anode. Backed by this, the concentration of the liquid fuel can be increased, so that the power generation with the liquid fuel of an optimum concentration can be performed in return for the conventional power generation using the liquid fuel of low concentration. As a result, the power generation efficiency can be improved.

Still, there is further provided a gaseous fuel oxidization unit oxidizing parts of a gaseous fuel supplied and generating a generated gas that reacts with the rest of the gaseous fuel at the anode, so that the gaseous fuel can have a higher concentration, and as a result, the concentration of the liquid fuel in the fuel storage unit can be increased to higher. Therefore, the power generation efficiency can be kept continuously and the maintainability of the liquid fuel in the fuel storage unit such as replenishment, replacement, or the like can be improved.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A fuel cell comprising:
   a power generation unit configured to include a positive electrode that reduces oxygen as an active material, a negative electrode that oxidizes a gaseous fuel, and an electrolyte layer provided between said positive electrode and said negative electrode;
   a fuel storage unit to store a liquid fuel;
   a pressure application unit to apply pressure to the liquid fuel stored in said fuel storage unit;
   a liquid fuel vaporization unit to dissolve and diffuse the liquid fuel pressed by said pressure application unit to vaporize the fuel, and to emit the vaporized fuel as a gaseous fuel; and
   a gaseous fuel oxidization unit to generate a reactive gas by oxidizing parts of the gaseous fuel emitted from said liquid fuel vaporization unit and supplying the reactive gas and remaining parts of the gaseous fuel to the negative electrode,
   wherein the reactive gas is one that is caused to chemically react with the remaining gaseous fuel at the negative electrode.

2. The fuel cell according to claim 1,
   wherein said liquid fuel vaporization unit includes at least one kind of a perfluoro sulfonic acid based resin, a perfluoro carbon based resin containing a carboxyl group, silicone, and polyimide, as a main material.

3. The fuel cell according to claim 1,
   wherein said gaseous fuel oxidization unit includes a gas introduction path to introduce oxygen needed to oxidize the gaseous fuel.

4. The fuel cell according to claim 1,
   wherein said gaseous fuel oxidization unit includes a catalyst including at least one kind of platinum, palladium, ruthenium, and rhodium, as a main material.

5. The fuel cell according to claim 1,
   wherein the liquid fuel includes a methanol solution being a mixed solution of water and methanol.

6. The fuel cell according to claim 1,
   wherein the reactive gas includes water vapor.

7. The fuel cell according to claim 1,
   wherein the liquid fuel includes a mixed solution of methanol and water, the methanol having a larger composition ratio than that of the water.

8. A fuel cell comprising:
   a power generation unit configured to include a positive electrode that reduces oxygen as an active material, a negative electrode that oxidizes a gaseous fuel, and an electrolyte layer provided between said positive electrode and said negative electrode;
   a fuel storage unit to store a liquid fuel;
   a pressure application unit to apply pressure to the liquid fuel stored in said fuel storage unit;
   a liquid fuel vaporization unit to vaporize the liquid fuel pressed by said pressure application unit to emit the vaporized fuel as a gaseous fuel; and
   a gaseous fuel oxidization unit to generate a reactive gas by oxidizing parts of the gaseous fuel emitted from said liquid fuel vaporization unit and supplying the reactive gas and remaining parts of the gaseous fuel to the negative electrode, wherein the reactive gas is one that is caused to chemically react with the remaining gaseous fuel at the negative electrode, and wherein said liquid fuel vaporization unit includes at least one kind of a perfluoro sulfonic acid based resin, and a perfluoro carbon based resin containing a carboxyl group, as a main material.

9. The fuel cell according to claim 8,
wherein said gaseous fuel oxidization unit includes a gas introduction path to introduce oxygen needed to oxidize the gaseous fuel.

10. The fuel cell according to claim 8,
wherein said gaseous fuel oxidization unit includes a catalyst including at least one kind of platinum, palladium, ruthenium, and rhodium, as a main material.

11. The fuel cell according to claim 8,
wherein the liquid fuel includes a methanol solution being a mixed solution of water and methanol.

12. The fuel cell according to claim 8,
wherein the reactive gas includes water vapor.

13. The fuel cell according to claim 8,
wherein the liquid fuel includes a mixed solution of methanol and water, the methanol having a larger composition ratio than that of the water.

* * * * *